United States Patent [19]

Speiser et al.

[11] Patent Number: 4,940,400
[45] Date of Patent: Jul. 10, 1990

[54] LUBRICATION SYSTEM FOR A ROTARY-PISTON INTERNAL COMBUSTION ENGINE

[75] Inventors: Josef Speiser, Wasserburg; Manfred Fischer, Lindau, both of Fed. Rep. of Germany

[73] Assignee: Wankel GmbH, Berlin, Fed. Rep. of Germany

[21] Appl. No.: 391,455

[22] Filed: Aug. 9, 1989

Related U.S. Application Data

[63] Continuation-in-part of Ser. No. 197,857, May 24, 1988, abandoned.

[30] Foreign Application Priority Data

May 26, 1987 [DE] Fed. Rep. of Germany ....... 3717802

[51] Int. Cl.$^5$ ............................................. F01C 21/04
[52] U.S. Cl. .................................... 418/61.2; 418/87; 418/94; 418/104
[58] Field of Search .................... 418/61.2, 84, 87, 91, 418/94, 98, 104; 277/81 P, 206 A

[56] References Cited

U.S. PATENT DOCUMENTS

| | | | |
|---|---|---|---|
| 3,213,801 | 10/1965 | Venyger | 418/61.2 |
| 3,323,713 | 6/1967 | Wenderoth et al. | 418/61.2 |
| 3,712,766 | 1/1973 | Jones | 418/88 |
| 3,832,980 | 9/1974 | Fujikawa et al. | 418/94 X |
| 3,907,307 | 9/1975 | Maurer et al. | 277/71 X |
| 4,218,200 | 8/1980 | Morita et al. | 418/94 X |
| 4,293,289 | 10/1981 | Morita | 418/88 X |
| 4,308,002 | 12/1981 | Di Stefano | 418/94 X |
| 4,830,591 | 5/1989 | Eiermann et al. | 418/94 |

Primary Examiner—John J. Vrablik
Assistant Examiner—David L. Cavanaugh
Attorney, Agent, or Firm—Robert W. Becker & Associates

[57] ABSTRACT

A lubrication system for a rotary-piston internal combustion engine of the trochoid type with a multi-arc-shaped trochoidal surface and a multi-cornered piston supported on a roller bearing. A dosed quantity of lubricating oil is supplied through an axial bore in the shaft and radial bores in the eccentric into the axial center of the bearing of the eccentric. The outer bushing of this bearing has a U-shaped axial cross-sectional shape and is provided with central radial bores which are aligned with bores in the piston and communicate with axial channels in the piston, the latter channels leading to radial bores in the internal gear of the mechanism. The cross-sectional aperture of these bores may be used to control the quantity of oil supplied to the gear mechanism.

10 Claims, 3 Drawing Sheets

LUBRICATION SYSTEM FOR A ROTARY-PISTON INTERNAL COMBUSTION ENGINE

This is a continuation-in-part of co-pending application Ser. No. 197,857-Speiser et al filed May 24, 1988, now abandoned, belonging to the assignee of the present invention.

BACKGROUND OF THE INVENTION

1. Field of the Invention

The present invention relates to a rotary-piston internal combustion engine t at includes a casing provided with two side parts or end plates and a piston housing or middle part having a trochoidal surface; an eccentric shaft passes axially through said casing and includes an eccentric on the shaft about which a multi-cornered or triangular piston moves or orbits on roller or needle bearings Sealing parts in piston corners continuously engage the trochoidal surface.

A synchronizing gear or synchromesh is provided between a housing side wall and the eccentric and the eccentric bearing, the sealing parts of the piston and the synchromesh are supplied with lubricating oil via bores in the eccentric shaft and in the eccentric.

In such engines, the eccentric bearings and the gears of the synchromesh are lubricated by cooling oil or by the intake air, essentially without quantitative metering or dosing, which above all requires that the working chambers be sealed against oil passing from the bearing and the gear space, and also results in a high oil consumption Description of the Prior Art With such known engines, the oil required for cooling of the piston and of the eccentric bearing is conveyed via axial and radial bores in the eccentric shaft and the eccentric in the piston and the eccentric shaft. This eccentric bearing conventionally is a slide bearing, through which, in order to keep the bearing "floating", respectively according to size several liters of oil per minute must be pressed under pressure. This oil discharges from the bearing into the piston for the cooling of which likewise these and larger oil quantities are required or needed per time unit. Also, if a rolling bearing were employed in place of the sliding bearing, the roller bearing is located in the oil flow cooling the piston. Via an arrangement of valves controlled by centrifugal force and located in bores of the eccentric shaft, the supply of cooling oil in the piston inner chambers or spaces is to be controlled or regulated corresponding to the speed of the eccentric shaft. Also such a valve arranged in an eccentric was proposed that upon closing of the oil supply to the eccentric bearing increases at higher rotational speeds and reference can be made to U.S. Pat. No. 4,293,289-Morita dated Oct. 6, 1981 particularly in FIG. 3 thereof.

The cooling of the piston with these oil quantities or oil volume necessary for doing so, as in general on the whole every oil excess in the bearing and drive or transmission chamber of the engine, makes necessary oil-interior seals with respect to the working chambers or spaces, since the oil passing over thereto delivers or provides a considerable and important contribution to worsening of the combustion exhaust or waste gases.

U.S. Pat. No. 3,213,801-Venygr dated Oct. 26, 1965 can be noted because the cooling oil for the piston only enters via the sliding bearing into the piston inner space or chamber and discharges again, which piston inner chamber is completely closed-off as to the bearing space or chamber and gear chamber and the piston outer side. To that extent with this arrangement also an oil inner seal would be avoided. This machine however belongs to a completely different class or genus, namely that of cellular engines (wing or vane-cell engines), whereby here the vanes are replaced by rollers. These engines differ from the Wankel engines most of all thereby that they are not sealed-off with sealing elements and consequently require oil for parts forming a sealing of the working chambers. Consequently this Venygr patent cannot be taken into consideration for evaluation of the features of the present invention.

The machine or engine of the Venygr disclosure concerns an engine with rolling piston rotors belonging to a completely different genus of machines with a circular-shaped mantle or a housing raceway and a piston not controlled or regulated by a synchromesh drive or transmission. The eccentric of the piston runs upon a friction or sliding bearing through the radial bores of which cooling oil is supplied and discharged in the interior of the piston via bores respectively out of axial bores in the shaft and bores in the eccentric. The oil that passes therethrough serves for cooling of the engine with the rolling piston rotors per se. Thus this machine or engine of Venygr represents nothing different or other than the previously noted friction or sliding bearing machines. Also the machine or engine in order to maintain the necessary oil film for the friction or sealing bearing requires a higher oil pressure and also requires greater through-passage quantities or volume of oil because of the cooling of the piston, as shown by the supply and discharge lines for oil in the shaft and in the eccentric.

U.S. Pat. No. 3,323,713-Wenderoth et al dated June 6, 1967 describes a typical slide-bearing arrangement with oil-cooled piston means. Consequently costly and complex oil inner seals are required including the seals 44, 64 and 76, 78 thereof At most this Wenderoth et al reference includes supply of oil via bores in the shaft and eccentric. This engine of the Wenderoth et al patent has exactly the disadvantages which are to be avoided in accordance with the teaching of the present invention.

U.S. Pat. No. 3,712,766-Jones dated Jan. 23, 1973 can be noted only because here a roller bearing is employed for the piston, which however lies completely in the flow of the pressurized oil, which discharges at an orifice of a passage 28 and flushes or flows through the piston under pressure and in large quantities or volume.

The Jones disclosure has a piston that is fully oil cooled for which the aforementioned through-passage quantities or volume are necessary or required in the same manner as with the Morita et al disclosure. The oil pressure is sprayed out of a bore into a right hollow space or chamber of the eccentric and from there is pressed by centrifugal force effect via another bore into the roller bearing and from there comes or reaches into the piston interior spaces or chambers and synchromesh drive or transmission spaces or chambers. The greatest part of the supplied oil is conveyed away or discharged over this path or in this manner. Consequently, the same conditions exist as with friction or sliding bearing versions.

U.S. Pat. No. 3,832,980-Fujikawa et al dated Sept. 3, 1974 basically has the same applicable comments as for the Wenderoth et al disclosure. The cooling oil for the piston passes nearly completely through the slide bearing thereof, partially through the left shaft bearing, into the piston inner space and gear chamber. Also here the large volume or through-passage of pressurized oil is required and needed and the same is true as stated for the Wenderoth et al disclosure. The inner seal moreover is not drawn or illustrated hereby but naturally is needed and required. The assignee (Kawasaki) of the Fujikawa et al disclosure concerned itself only briefly with such engines.

The two U.S. Pat. Nos. 4,,218,200-Morita et al dated Aug. 19, 1980 and U.S. Pat. No. 4,293,289-Morita dated Oct. 6, 1981 show and disclose a cooling of a piston with a slide bearing and flow or through-passage of large pressurized oil quantities or volume; these two disclosures moreover are limited or restricted to the region of the oil inner seal. A costly and complex double Mazda-oil inner seal is required in order to keep away from the combustion chambers the oil flowing through the engine inner space or chamber. Noteworthy here however is the centrifugal-force-controlled valve and a bore of the shaft, via which at higher rotational speeds additional cooling oil is brought to the outer side of the piston. Consequently large quantities or volumes of pressurized oil exist within the oil inner seal, in any event at higher rotational speeds.

The Morita et al disclosure represents a special situation with which the oil is conveyed from the bearing first into annular spaces or chambers after or behind the oil seals in order to cool the same preferably with the sought or desired higher temperature loads and preferably because of the elastomeric O-ring means located in these seals. Moreover this machine or engine provides a fully oil-cooled piston as proven by the presence or provision of oil seals at a full pressurized oil through-passage via the eccentric bearing in the oil quantities or volumes as set forth.

In FIG. 3 of U.S. Pat. No. 4,293,289-Morita dated Oct. 6, 1981 there is shown a further centrifugal force and spring-control valve 40 which however is to multiply the oil conveying into the slide bearing at higher rotational speeds in that the draining or discharge of the oil via the opening 41 is blocked. The entire oil flowing in the bore 23 consequently at higher rotational speeds comes into the slide bearing.

The prior art disclosures with the exception of U.S. Pat. No. 3,712,766-Jones all describe motors or engines with full oil cooling of the piston and with slide bearings between the eccentric and piston. These slide bearings require an oil film produced by a considerable oil pressure upon which oil film the bearings run or operate as well as requiring an oil through-passage of several liters of oil per hour. Since the oil simultaneously is utilized for piston cooling, the oil requirement of the bearing can occur via a supply of cooling oil through the friction or sliding bearing.

It is thus a general state of the art whereby mostly the oil supply occurs via axial and radial shaft bores as shown by the prior art disclosures.

With all of these prior art disclosures there is noted that the engines are described with which the piston bearing lies in the flow of the piston-cooling oil, which is conveyed under pressure in multiple liters per minute while with the present invention per hour only 50 grams of oil or lubricant pass through the roller bearing of the piston. For comparison purposes, reference can be made to the following table of features listing the various prior art disclosures as well as the teaching of the present invention and in which the "X" represents the presence of a feature and the designation "O" represents the lack of a feature.

|   |   | Venygr A | Wenderoth B | Jones C | Fujiwaka D | Morita E | Morita F | Application |
|---|---|---|---|---|---|---|---|---|
| 1 | oil-cooled piston | X | X | X | X | X | X | O |
| 2 | slide bearing | X | X | O | X | X | X | O |
| 3 | roller bearing | O | O | X | O | O | O | X |
| 4 | bore in the shaft | X | X | O | O | X | X | X |
| 5 | oil discharge from the shaft only into the bearing | X | O | O | O | O | O | X |
| 6 | oil discharge from from the shaft also besides the bearing | O | X | O* | X | X | X | O |
| 7 | centrifugal-force-control valve for oil discharge beside the bearing | O | O | O | O | X | X | O |
| 8 | centrifugal-force-control valve in eccentric for control or regulation of oil discharge into the bearing | O | O | O | O | O | X | O |
| 9 | centrifugal-force-control valve in the eccentric for blocking of oil discharge into the bearing during standstill of the machine | O | O | O | O | O | O | X |
| 10 | lip seal ring around shaft | O | O | O | O | O | O | X |

*The oil is sprayed or injected from a side part into the piston inner chamber and comes through a bore in the eccentric into the middle of the roller bearing.

SUMMARY OF THE INVENTION

It is therefore an object of the present invention to achieve a controlled and quantitatively metered lubrication of the eccentric bearings and of the synchromesh.

The object of the present invention accordingly besides the oil cooling of the piston is to avoid the costs and complexity involved with pressurized oil which is necessary for the slide bearing means and to provide a bearing arrangement which requires only such small or nominal oil quantities or volume that the oil excess discharging again is still just adequate or sufficient for the lubrication of the gear means and the sealing parts of the piston. The costly, complex and in practice unreliable oil inner seals are eliminated completely.

A further object of the present invention is to prevent that during standstill of the engine any oil can collect in the bearing space and gear chamber of the engine. Finally, an object of the present invention is to assure that the oil discharging again from the bearing and designated for lubrication of the synchromesh or synchronized gear means and the sealing parts of the piston in essence comes only into the synchromesh.

The lubrication system of the present invention is characterized in that an axial bore is provided in the shaft and extends into the eccentric, where it communicates with one or more bores of the eccentric that extend to the center of the eccentric bearings; passage means in the piston on the one hand communicate with radial bores in a bearing bushing of the eccentric bearings, and on the other hand communicate with radial bores in an internal gear, with metering or quantitative supply of oil being regulated by the apertures of the radial bores in the internal gear or of the bores and passage means in the bearing bushing and piston.

The bearing lubrication system according to the present invention contributes to a constant cool temperature of the bearing, whereas with a lateral oil supply the remote bearing section becomes too hot. It is possible to control the synchromesh lubrication exactly via the cross-section of the radial bores, each of which leads to the root of the teeth of the internal gear, so that only such an amount of oil will enter the gear space and the gap between the piston and the side part, that an inside oil seal may be eliminated. The same holds true for the other piston side as well, where, due to the U-shaped configuration of the outside bearing bushing, the oil is collected under the influence of the centrifugal force, and then is drained off towards the internal gear of the gear mechanism. As a result, only a very small quantity of oil enters the gap between the adjoining side wall of the casing and the piston.

Further specific features of the present invention will be described in detail subsequently.

BRIEF DESCRIPTION OF THE DRAWINGS

This object, and other objects and advantages of the present invention, will appear more clearly from the following specification in conjunction with the accompanying schematic drawings, in which.

DESCRIPTION OF PREFERRED EMBODIMENTS

Figure 1:
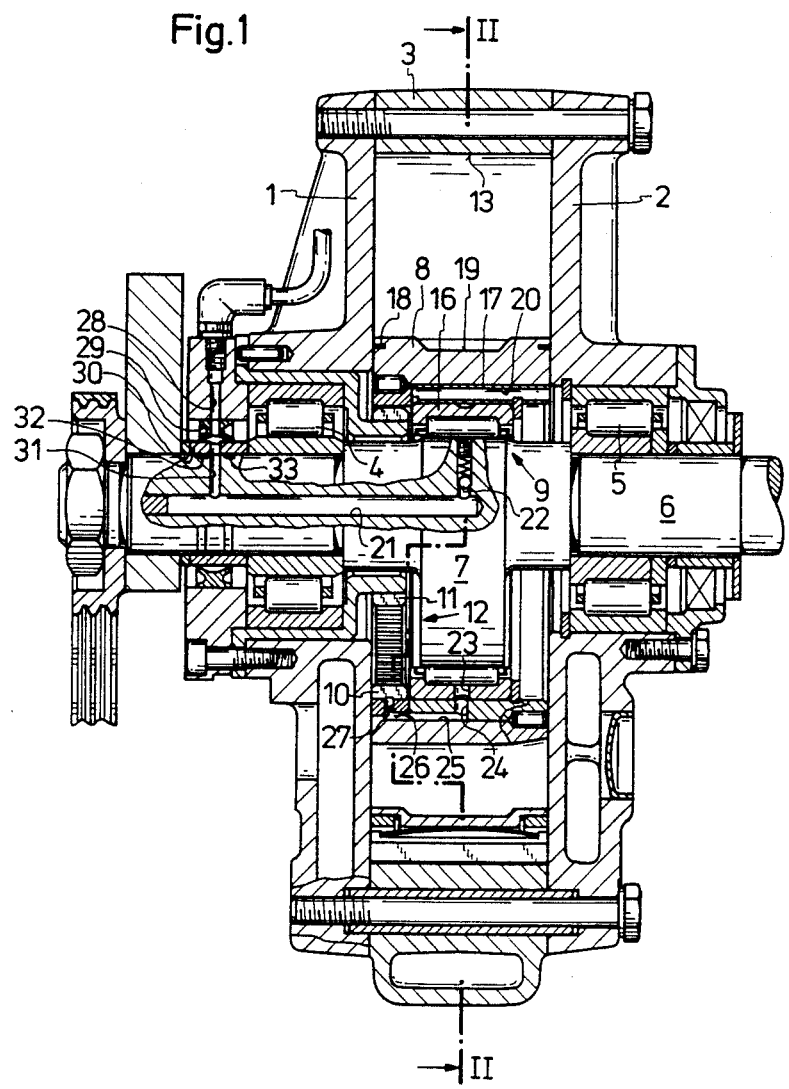
FIG. 1 is an axial, partly broken-away cross-sectional view of an engine that is provided with one exemplary embodiment of the inventive lubrication system, and is taken in plane I—I of FIG. 2.

Referring now to the drawings in detail, the casing of the illustrated internal-combustion engine comprises the end plates or side parts 1 and 2, as well as the cover part or piston housing 3 The shaft 6, which is supported in the side parts 1 and 2 at points 4 and 5, is provided with an eccentric 7 about which the rotor or piston 8 rotates on a roller bearing 9. Provided on the left side of the eccentric is the gear mechanism 12, which is composed of an annular or internal gear 10 that is secured to the piston 8, and a pinion 11 that is fixedly arranged around the shaft in the left side part 1.

Figure 2:
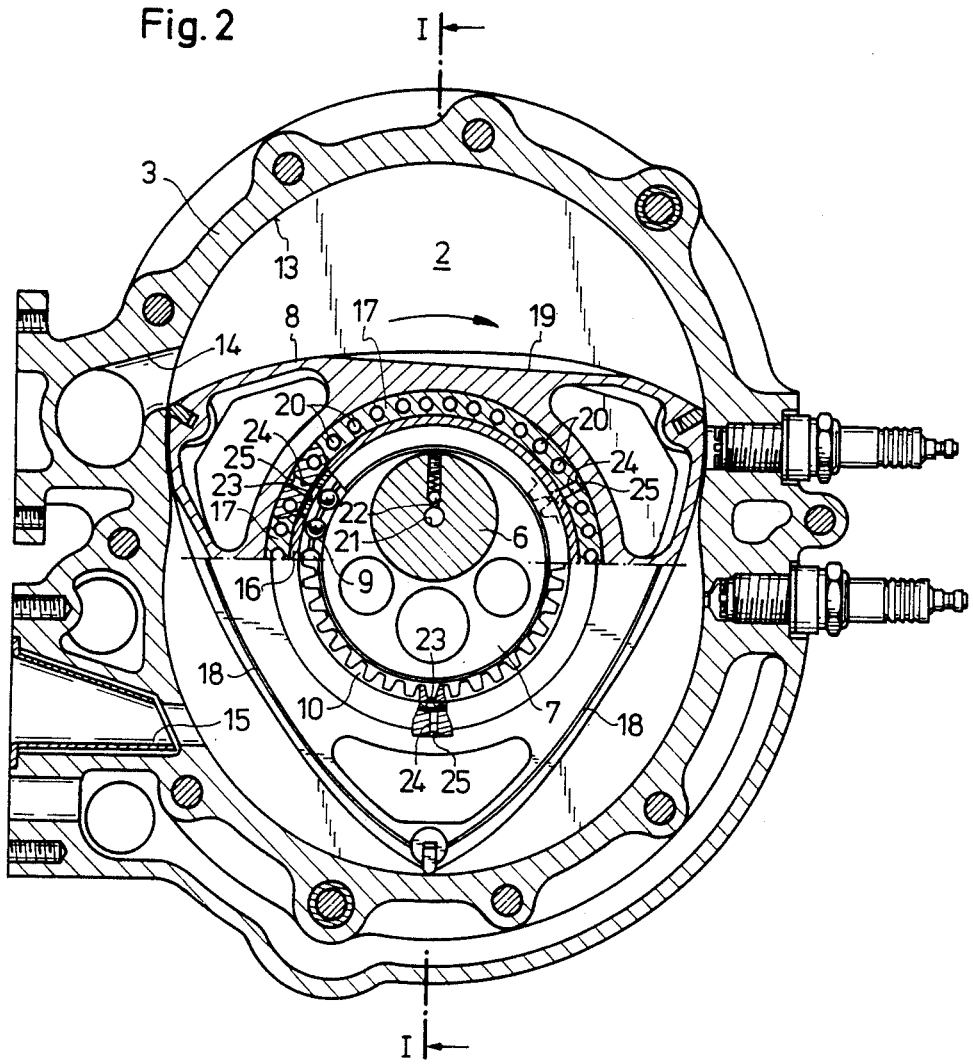
FIG. 2 is a radial, partially broken-away cross-sectional view of the same engine as that shown in FIG. 1, taken in plane II—II of FIG. 1.
Figure 3:
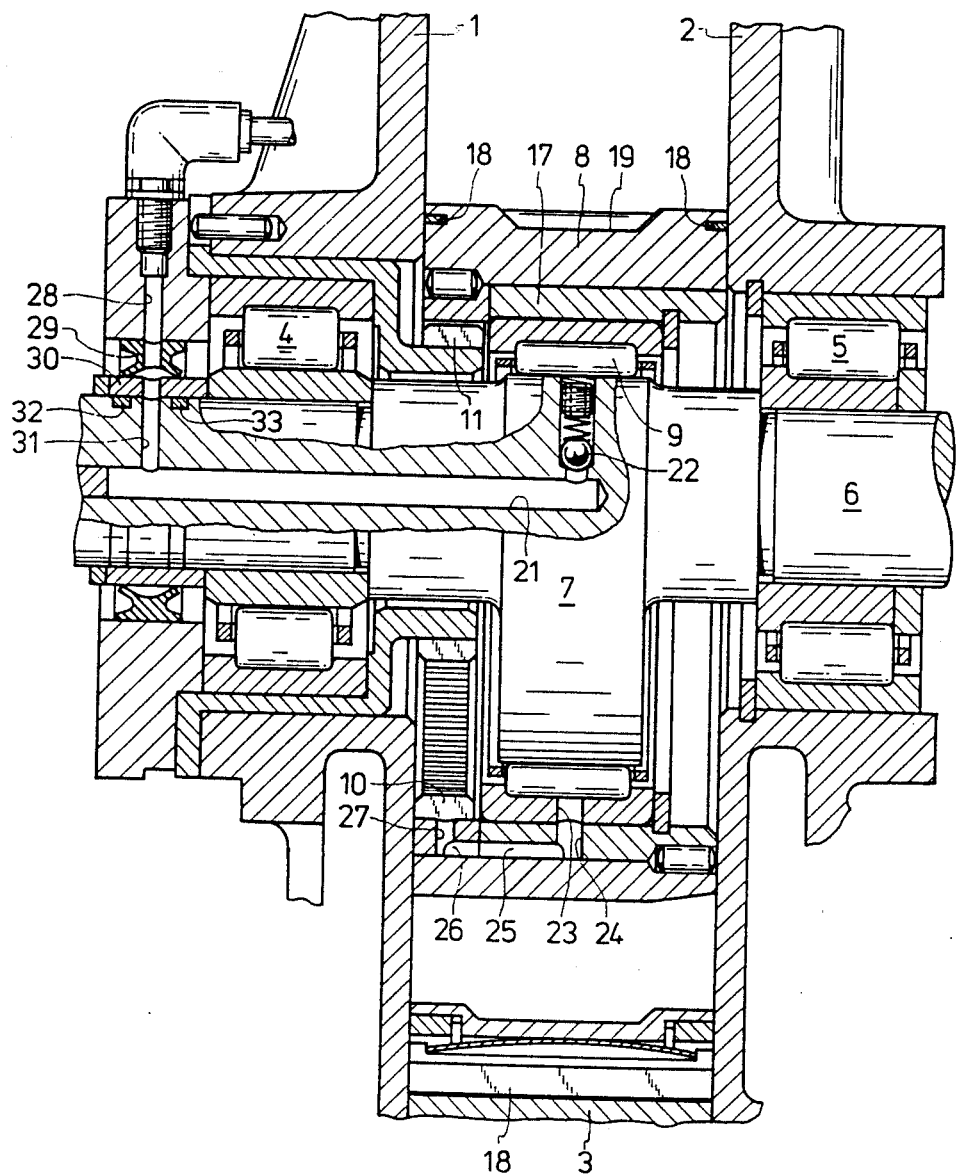
FIG. 3 is an enlarged sectional fragmentary view of a portion of the engine shown in FIG. 1.

FIG. 2 shows the bi-arc-shaped trochoidal surface 13 and the triangular rotor or piston 8. An intake 14 is provided, while an exhaust 15 exists in the piston housing. The piston 8 is provided with an element in the form of a ring bearing 17, as well as seals 18 that are gas seals only. The ring bearing 17 supports or is connected with the internal gear 10 and with the bearing bushing 16 of the roller or needle bearing 9; the bushing 16 has a U-shaped axial cross-sectional shape. The ring bearing 17 serves the purpose of protecting the roller bearing 9 against heat transfer from the hot zones of the piston recesses or chambers 19. To this end, the ring bearing 17 may be provided with hollow spaces, such as the axially extending bores 20 illustrated in FIG. 1. The shaft 6 is provided with an axial bore 21 into which a spring-biased ball-check valve 22, under control of spring force and centrifugal force, opens and with which oil or lubricant supply to the roller bearing 9 is choked-off, forestalled or prevented during standstill of the engine. There must be avoided that when unconsumed oil or lubricant comes via the roller bearing 9 into inner spaces or chambers of the engine, that it does not collect therein In view of the missing oil seals, this spring-biased ball-check valve 22 is an indispensable component and feature of the present invention, since otherwise the necessary and required oil dosage in a proportion or metered quantity would be impossible. This spring-biased ball-check valve 22 is located in a passage which opens into the axial center or middle of the roller bearing 9, from where the oil or lubricant is distributed uniformly over the entire bearing on both sides of the rollers to ensure uniform lubrication of the eccentric bearing.

Radially extending bores 23 in the axial center of the bearing bushing 16, and bores 24 in the ring bearing 17, which bores 24 are aligned with the bores 23, are provided for the lubrication of the gear mechanism 12. The bores 24 open into axially directed grooves 25 at the outside of the ring bearing 17, which grooves 25 lead to the left to the internal gear 10 and form closed channels as soon as the ring bearing has been installed. To the left side, joining these grooves 25 is an annular groove or chamber 26 that is formed by a recess in the piston 8, and in turn communicates with one or more radial bores 27 in the internal gear 10, the latter bores leading to the root of the teeth in the internal gear 10.

The bores 23 in the bearing bushing 16, and the bores 24 and the grooves 25 in the ring bearing, are expediently arranged in the area of the piston corners or apexes, rather than in the hot zones of the rotor recesses 19, so as to avoid possible conversions in the lubricating oil.

As a result of the centrifugal force, the oil supplied through the axial bore 21 in the shaft 6 arrives through the bore(s) 22 into the roller bearing 9. The rotating movement of the rollers distributes the oil among them, while the oil is passed at the same time into the U-shaped bearing bushing 16 due to the effects of the centrifugal force. The oil is then passed from there into the mutually aligned bores 23 of the bearing bushing 16 and bores 24 of the ring bearing 17, again under the effects of the centrifugal force. The pursuing oil then presses the oil from there in the axial grooves 25 in the outside of the ring bearing 17 into the bores 27 in the internal gear 10. Thus, the gear 12 is lubricated in a well-dosed manner, with the possibility of controlling the dosage through the cross-section of the bores 27 in the internal gear 10, which is smaller than the cross-section of the preceding bore 24 in the ring bearing 17 to a corresponding extent. This is the reason why only such a quantity of oil enters the clearance between the piston and the side parts as is just required to lubricate the gas sealing elements, so that an inside oil sealing may be saved, i.e. eliminated.

The oil or lubricant is supplied via a bore 28 in the side part 1 into a bore in a lip seal 29, which engages securely and positively with a cylindrical outer wall in the side part 1. Lips thereof engage on both sides of an annular groove provided therebetween against a bearing or slide ring 30 revolving or rotating with the shaft together with which an annular chamber is formed thereby as a dead space or gap for the supplied oil or lubricant. Radially through the slide ring 30 there is a bore aligned with a radial bore 31 in the eccentric shaft 6, and which opens into the axial bore 21 thereof The slide ring 30 is sealed-off with ring or annular seals 32 and 33 in circumferential joint upon an inner side of the slide ring 30 on both or opposite sides of the radial bore thereof.

With this arrangement there is attained that the oil or lubricant continuously and via the centrifugal-force effect exerted upon the oil or lubricant in the bore for the valve 22 during rotation of the eccentric roller bearing 9 is suctioned off or removed from the dead space or gap between the lips of the lip seal 29 corresponding to the rotational speed of the shaft 6. Without this dead space or gap, the oil or lubricant would enter intermittently into the axial bore 21 of the eccentric shaft 6 only at a time respectively during alignment of the bore 31 with the bore 28.

The feature of the blocking valve in the eccentric as well as the features of the lip seal on the oil supply out of the side part of the eccentric shaft can be considered as novel improvements which are absolutely necessary in order to attain the desired oil dosage or metering. Without these features there is noted that the construction is unusable, especially without the valve in the eccentric. The inner space or chamber of the machine or engine during standstill thereof would fill with oil and upon starting of the engine there is noted that this entire oil quantity or volume would overflow or pass into the working chambers. Likewise the dead-space formation in the lip seal at the oil supply out of the housing into the eccentric shaft is unavoidable. With the smaller or more nominal oil quantities or volume, which are here supplied respectively consumed, the intermittent oil supplY would be basis for having fear as to danger of an under supply of oil to the bearing means. Also both features in accordance with the present inventive teaching represent an inventive unit, since both serve the same purpose, namely the control or regulation of oil supply, and since with elimination of one of the features also the other feature would be useless.

To avoid disadvantages of through-passage of pressure oil in large quantities or volume and in order to be able to eliminate oil seals, for an engine in accordance with the present invention, there is provided a roller bearing for the piston in the middle of which only a minimum quantity or volume of oil, which means not more than 50 grams per hour is supplied in metered or dosed quantity or volume via an axial bore in the eccentric shaft and a radial bore in the eccentric.

In order to prevent that during standstill or the engine, oil would come into the piston bearing and then could collect in spaces or chambers within the gas seals, a centrifugal-force-controlled valve is provided in the radial bore in the eccentric, which valve opens only during rotation or operation of the engine.

In order attain a minimal oil supply, a sealing ring fixed or stationary in the housing or casing side wall is provided around the eccentric shaft over the inlet bore in the axial bore of the eccentric shaft and this sealing ring has a bore which aligns with the oil supply line in the housing side wall and which forms an annular space or chamber between the lips thereof engaging against the shaft.

The oil or lubricant contained in this annular chamber is suctioned into the radial bore of the eccentric shaft via the centrifugal force effect of the rotating eccentric. The excess oil discharging again laterally on the eccentric bearing via the centrifugal-force effect comes into the sealing parts of the piston, upon the side of the synchromesh first therein and moreover in such small or nominal quantities or volume as is necessary or required just for lubrication of the parts.

For feeding or supplying of the oil from the eccentric bearing into the synchromesh, in the outer shell or raceway of the eccentric bearing and the part of the pistons surrounding the same, can have passages arranged therein which lead to a tooth base of the outer gear of the synchromesh With the present inventive machine or rotary piston engine there is noted that the piston is not cooled with oil out rather with air or an air-fuel mixture and consequently no cooling oil is pressed through the eccentric bearing as with the machines or engines of the prior art. In comparison with the oil quantities of volume of several liters per hour there is noted that here not only fewer than 100 grams, actually 20 to 50 gram oil per hour is consumed, accordingly only just so much as is necessary for lubrication of the eccentric bearing, of the synchromesh drive or transmission and the gas sealing parts.

This has the advantage that oil hardly comes or reaches into the working or operating chambers and it is possible to eliminate the costly, complex and problematic oil seals. Consequently there is brought about also an essential improvement of exhaust gases of the motor or engine, since these do not contain any combustion residue from the oil.

Previously known arrangements have only features which serve for oil cooling of the piston with large or great through-passage quantities or volume, with which the cooling oil must be kept remote or away from the working or operating chambers of the machine via complex and costly oil seals, with which however an overflow or passage of essential oil quantities into the working or operating chambers cannot be avoided.

Oil conduits or bearings are shown with these previously known arrangements and according these oil lines or conduits continue into the outer shells or raceways of the bearings and into the piston interior spaces or chambers Accordingly the oil passes from the bearing laterally into the inner piston spaces or chambers for cooling thereof.

The present invention is directed to lubricating system of a rotary piston internal combustion engine with a housing or casing consisting of two side parts and a middle or central part with trochoidal-shaped mantle or surface raceways, which housing has an eccentric shaft passing axially therethrough and upon an eccentric of which there rotates a multi-corner or triangular piston not cooled with oil although rotating upon rollers or needle bearings with a minimum dosage of lubricating oil which is supplied via bores in the shaft and in the eccentric to the middle of the eccentric bearing.

A triangular piston rotates upon roller bearing means upon the eccentric thereof and subject to continuous engagement of the sealing parts of the piston against the inner trochoidal surface or mantle runway and the side walls of the housing or casing. The synchromesh is provided between one housing or casing side wall and the eccentric and the eccentric bearing, the sealing parts and the synchromesh are supplied with lubricating oil via bores in the eccentric shaft and the eccentric.

The foregoing is further characterized by the following features:
 (1) the triangular piston is not fluid or liquid cooled;
 (2) in the eccentric lead only into the eccentric bearing;
 (3) the oil quantity or volume supplied via these bores is restricted to a value of up to 100 grams, preferably in a range of 20 to 50 grams oil or lubricant per hour and specifically to 50 grams per hour;
 (4) a centrifugal-force-controlled valve is provided in a bore located in the eccentric and leading to the eccentric bearing; and
 (5) around the eccentric shaft at the inlet opening for the lubricating oil into the bores into the eccentric shaft there is a sealing ring engaging against the shaft and having sealing lips forming an annular space or chamber with a radial bore aligned with the oil supply line.

The present invention is, of course, in no way restricted to the specific disclosure of the specification and drawings, but also encompasses any modifications within the scope of the appended claims.

What we claim is:

1. A rotary-piston internal combustion engine that includes a casing provided with two side parts and a middle housing part with an inner trochoidal surface, as well as an eccentric shaft that passes axially through said casing and supports an eccentric about which a multi-cornered triangular piston free of lubricant oil liquid cooling moves on roller or needle bearings of eccentric bearing means, said piston having sealing parts continually in engagement with the trochoidal surface of the middle housing part and side parts therewith, and with an internal gear of a synchromesh gear mechanism being secured to said piston as well as being provided with a gear space and a gap between the piston and the side part having an adjoining side wall, as well as including a lubrication system of the rotary-piston internal combustion engine for which lubricant oil is supplied via bores in the eccentric shaft and eccentric relative to the eccentric bearing means, the sealing parts and the synchromesh gear mechanism, the improvement therewith comprising:
 means forming an axial bore that is provided in said eccentric shaft and that extends to lead only into said eccentric bearing means, said axial bore communicating with at least one first radial bore of said eccentric;
 a centrifugal-force-controlled valve means provided in said bore of said eccentric leading up to said eccentric bearing means for metering and dosing of lubricant oil collectively regulated for only restricted lubrication of said eccentric bearing means and of the synchromesh gear mechanism as necessary so that only such a restricted amount of lubricant oil in a volumetric quantity up to only 100 grams per hour enters the gear space and the gap between the piston and the side part and so that an inside oil seal is eliminated along with a result that only a very small quantity of lubricant oil enters the gap between the adjoining side wall of the casing and the piston; and
 a sealing ring located around said eccentric shaft at an inlet opening for the lubricant oil into the bore in the eccentric shaft, said sealing ring including seal lips that form an annular space with the radial bore aligned with an oil supply line.

2. A rotary-piston engine lubrication system according to claim 1, in which lubricant oil volumetric quantity is restricted to a range of between 20 and 50 grams per hour.

3. A rotary-piston engine lubrication system according to claim 1, in which lubricant oil volumetric quantity is restricted to 50 grams per hour.

4. A rotary-piston engine lubrication system according to claim 1, including at least one first radial bore of said eccentric, with said at least one first radial bore extending to the central portion of said eccentric bearing means; said piston being provided with passage means that on the one hand communicate with second radial bores in said bearing bushing of said eccentric bearing means, and that on the other hand communicate with third radial bores in said internal gear.

5. A rotary-piston engine lubrication system according to claim 4, including apertures of one of said third radial bores in said internal gear, and said second radial bores and passage means in said bearing bushing and piston respectively.

6. A rotary-piston lubrication system according to claim 5, in which said bearing bushing of said bearing means is U-shaped, and a ring bearing is disposed about said bearing bushing between the latter and said piston, with said second radial bores of said bearing bushing and fourth radial bores of said ring bearing being axially centrally disposed and being aligned with one another, whereby said fourth radial bores of said ring bearing form part of said passage means of said piston, which passage means also include axially directed grooves on a radially outer side of said ring bearing, with said grooves communicating with said fourth radial bores of said ring bearing and with said third radial bores of said internal gear.

7. A rotary-piston lubrication system according to claim 6, in which, in order to effect metering of oil to said gear mechanism, the cross-sectional area of said third radial bores of said internal gear are less than the cross-sectional area of said fourth radial bores of said ring bearing 8. A rotary-piston lubrication system according to claim 6, in which said internal gear has teeth with roots into which each of said third radial bores leads.

9. A rotary-piston lubrication system according to claim 6, which includes means for the axial supply of oil to said axial bore in said shaft.

10. A rotary-piston lubrication system according to claim 6, which includes seal means for said shaft, and fifth radial bore means that is supplied with oil, is provided in the vicinity of said seal means in one of said side parts, and communicates, during rotation of said shaft, with sixth radial bores that are provided in said shaft and communicate with said axial bore thereof to supply oil thereto.

* * * * *